United States Patent [19]
Urien

[11] Patent Number: 5,487,073
[45] Date of Patent: Jan. 23, 1996

[54] TEST SYSTEM FOR A VERY HIGH-SPEED RING NETWORK AND AN OPERATING PROCEDURE FOR THE SYSTEM

[75] Inventor: Pascal Urien, Villepreux, France

[73] Assignee: Bull S.A., Paris, France

[21] Appl. No.: 956,631

[22] Filed: Oct. 5, 1992

[30] Foreign Application Priority Data

Oct. 8, 1991 [FR] France ................... 91 12372

[51] Int. Cl.$^6$ ............................ H04Q 3/00; H04J 3/14
[52] U.S. Cl. .................. 371/20.6; 371/20.1; 370/14
[58] Field of Search .................. 371/20.6, 20.1, 371/20.3, 20.4, 20.5, 25.1; 370/13, 14, 15

[56] References Cited

U.S. PATENT DOCUMENTS

| | | | |
|---|---|---|---|
| 3,778,767 | 12/1973 | Carlyle et al. | 340/146.1 |
| 4,777,330 | 10/1988 | Nakayashiki et al. | 178/69 |
| 4,899,142 | 2/1990 | Nakayashiki et al. | 340/825.05 |
| 5,023,872 | 6/1991 | Annamalai | 371/20.6 |
| 5,072,447 | 12/1991 | Perloff | 371/20.1 |
| 5,210,748 | 5/1993 | Onishi | 370/85.13 |
| 5,289,474 | 2/1994 | Purcell | 371/20.5 |
| 5,291,491 | 3/1994 | Hutchison | 370/85.5 |
| 5,307,353 | 4/1994 | Yamashita | 370/15 |
| 5,374,926 | 12/1994 | Szczepanek | 340/825.52 |

OTHER PUBLICATIONS

FDDI: Meeting the Interoperability Challenge, Benson, Ciarfella, Hayden, IEEE 1990 pp. 253–260.
"Testing FDDI Networks, But at a Price", Data Communications International, vol. 19, No. 13, Oct. 1990, New York, New York, pp. 137–138.
"Working With FDDI: A Designer's Guide", Electronic Design, vol. 38, No. 8, Apr. 26, 1990, Cleveland, Ohio, pp.—95–105.
"A Real-Time Monitor for Token Ring Networks", A. C. Weaver et al., Milcom 89, vol. 1, Oct. 1989, Boston, Mass., pp. 794–798.

*Primary Examiner*—Gopal C. Ray
*Assistant Examiner*—Paul R. Myers
*Attorney, Agent, or Firm*—Weingarten, Schurgin, Gagnebin & Hayes

[57] ABSTRACT

A test system for a very high-speed ring network and an operating procedure for the system is provided that can be used with a communications coupler in which function tests are implemented and wherein a processor executes specific test software. The test system of the invention is also able to drive any communications coupler connected to the network, and can display the entire network on a screen of the minicomputer. The test system includes: a data processing unit with a display device for viewing the data connected through a specific link to a communications coupler that is connected to the network; a network test program running on the data processing unit; a set of function tests implemented in the communications coupler for generating frames on the network, wherein the test program controls both the communications coupler by sending it commands to perform the set of tests, and commands to display information on the status of the network as received by the coupler and sent by the coupler to the processing unit. The test system of the invention is applicable to FDDI or TPDDI networks.

5 Claims, 6 Drawing Sheets

LEGEND:
AP MAIN RING
AS SECONDARY RING
C BOARD
CB PLUG-IN BOARD
CNx STANDARD CONNECTORS
DA PHYSICAL ADAPTER
DAT TEST SYSTEM PHYSICAL ADAPTER
DISC DISK DRIVE
DPC GATEWAY DEVICE
FDI COMMUNICATIONS COUPLER
FDIT TEST SYSTEM COMMUNICATIONS COUPLER
GPU UNIVERSAL COUPLING DEVICE
IHA INTERFACE
IHT TEST INTERFACE
IC CONNECTING INTERFACE
L LINK
ORD COMPUTER
PC MINICOMPUTER
PSB PARALLEL BUS SYSTEM
RE NETWORK
ST TEST SYSTEM
VD DISPLAY SCREEN

FIG. 1

LEGEND:

| | |
|---|---|
| AP | MAIN RING |
| AS | SECONDARY RING |
| BC | CONTROL BUS |
| BHD | HIGH SPEED BUS |
| CAR | NETWORK ACCESS CONTROLLER |
| CGT | TRANSFER MANAGEMENT CONTROLLER |
| DA | PHYSICAL ADAPTER |
| DAT | TEST SYSTEM PHYSICAL ADAPTER |
| EC | CONTROL CHARACTER TRANSMITTER |
| ED | DATA TRANSMITTER |
| FDI | COMMUNICATIONS COUPLER |
| FDIT | TEST SYSTEM COMMUNICATIONS COUPLER |
| IHA | INTERFACE |
| IHAC | CONTROL CHARACTER INTERFACE |
| IHAD | DATA INTERFACE |
| IHT | TEST INTERFACE |
| LC | MICROPROCESSOR |
| MP | LINE CONTROL |
| MST | STORAGE MEMORY |
| RC | CONTROL CHARACTER RECEIVER |
| RD | DATA RECEIVER |
| SERV | SLAVE ELEMENTS |

FIG. 2

LEGEND:

| | |
|---|---|
| ALIM | POWER SUPPLY |
| CB | PLUG-IN BOARD |
| CNx | STANDARD CONNECTORS |
| DAT | TEST SYSTEM PHYSICAL ADAPTER |
| DISC | DISK DRIVE |
| FDIT | TEST SYSTEM COMMUNICATIONS INTERFACE |
| L | LINK |
| LOGT | TEST PROGRAM |
| PC | MINICOMPUTER |
| RE | NETWORK |
| VD | DISPLAY SCREEN |
| VT | TEST CASE |

FIG. 3

LEGEND:

| | |
|---|---|
| AI-An | AMPLIFIER CIRCUITS |
| BC | CONTROL BUS |
| BHD | HIGH SPEED BUS |
| BMC | CONTROL MEMORY BUS |
| CB | PLUG-IN BOARD |
| CN1 | STANDARD CONNECTOR |
| EC | CONTROL CHARACTER TRANSMITTER |
| ED | DATA TRANSMITTER |
| F1-Fn | WIRE CONNECTORS |
| FDIT | TEST SYSTEM COMMUNICATIONS INTERFACE |
| IHAC | CONTROL CHARACTER INTERFACE |
| IHAD | DATA INTERFACE |
| IHT | TEST SYSTEM INTERFACE |
| MP | MICROPROCESSOR |
| RC | CONTROL CHARACTER RECEIVER |
| RD | DATA RECEIVER |

FIG. 4

LEGEND:
GF        WINDOW GENERATOR
fo-fn     ARROWS
F0-Fn     WINDOWS
LOGT      TEST PROGRAM
N1-N4     LEVELS
SQ        PROGRAM SKELETON

TEST SYSTEM FOR A VERY HIGH-SPEED RING NETWORK AND AN OPERATING PROCEDURE FOR THE SYSTEM

FIELD OF THE INVENTION

This invention relates to test systems for high-speed ring networks, and particularly to a test system for data transmission networks of the FDDI and TPDDI types.

BACKGROUND OF THE INVENTION

Optical fiber networks are increasingly common, and are standardized by international standardization committees such as American National Standards Institute (ANSI) under reference number X3T9-5. These same standards have also been adopted by the International Standards Organization (ISO). They are also included in the definition of type TPDDI networks which currently tend to be used in local area networks where the transmission distances between the various stations or terminals are relatively short.

Information messages sent by the various stations of a network consist of a plurality of frames. A frame includes data bracketed in time by signals placed at the beginning and the end of the frame, such signals being called "control characters".

In addition, the components of a computer system (processors, RAM, ROM, controller, etc.) are mounted on a set of boards of dimensions that have been standardized. These boards are usually connected to a single parallel bus for providing communication between the various elements mounted on the boards, conveying data between them, and providing electrical power.

A computer of this kind is connected to an FDDI or TPDDI network through a gateway connecting device for adapting the data transmission conditions on the computer bus to the transmission conditions on the network in question.

Figure 1:
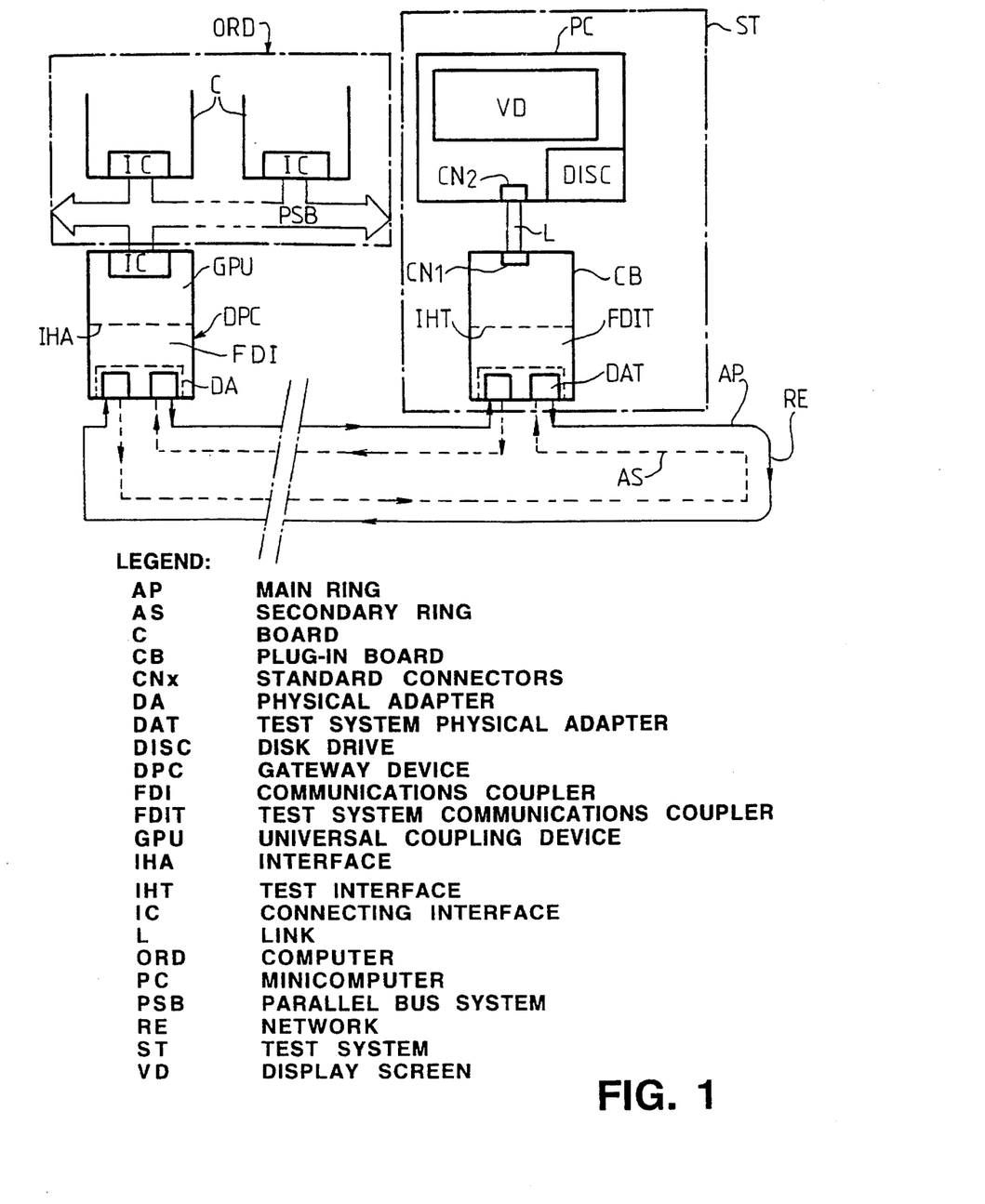
FIG. 1 is a block diagram that shows how a computer is connected to a network through a communications coupler, and also shows how the test system of the invention is connected to this network.

FIG. 1 shows the general structure of a gateway device DPC of this kind, and a computer ORD whose several component elements are mounted on a plurality of boards C communicating with one another through a bus PSB (parallel system bus). Each board C is connected to the PSB through a connecting interface IC. The type of connecting interface and the manner in which it communicates with the other functional components of the computer depend on the type of bus used. Generally the bus and connecting interface are precisely defined by standards (for example, the standards applicable to the MULTIBUS II bus, defined by standard IEEE1296).

The computer ORD is connected to a network RE in the form of a ring, of the FDDI (or TPDDI) type, for example, through a gateway connecting device DPC. Network RE includes a main ring AP and a secondary ring AS.

The gateway device DPC includes a universal coupling device GPU, a communications coupler FDI, and an interface IHA to transfer information between the GPU and the FDI.

The universal coupler GPU is connected to the PSB through a connecting interface IC, usually of the same type as the IC interfaces described above and associated with the boards C.

The gateway device DPC is physically connected to the network RE through a device DA that provides physical access to the network, associated with the communications coupler FDI.

The general structure of the device DPC as shown in FIG. 1, as well as the structure and function of the two elements GPU and FDI included in it, are described in detail in French Patent Application 89 10 156, filed Jul. 27, 1989 under the title "Gateway Device for Connecting a Computer Bus to a Fiber-Optics Ring Network"; corresponding to U.S. application Ser. No. 07/877,254, filed Apr. 28, 1992, a continuation of U.S. application Ser. No. 07/557,519, filed Jul. 24, 1990, now abandoned.

A test system can be connected to network RE by a communications coupler FDIT identical to communications coupler FDI of the gateway connecting device DPC. This is why it is useful to recall the essential components of such a communications coupler, it being understood that a more detailed description of the latter as well as its operation can be found in the French Patent Application 89 10 156, filed Jul. 27, 1989, herein incorporated by reference.

Figure 2:
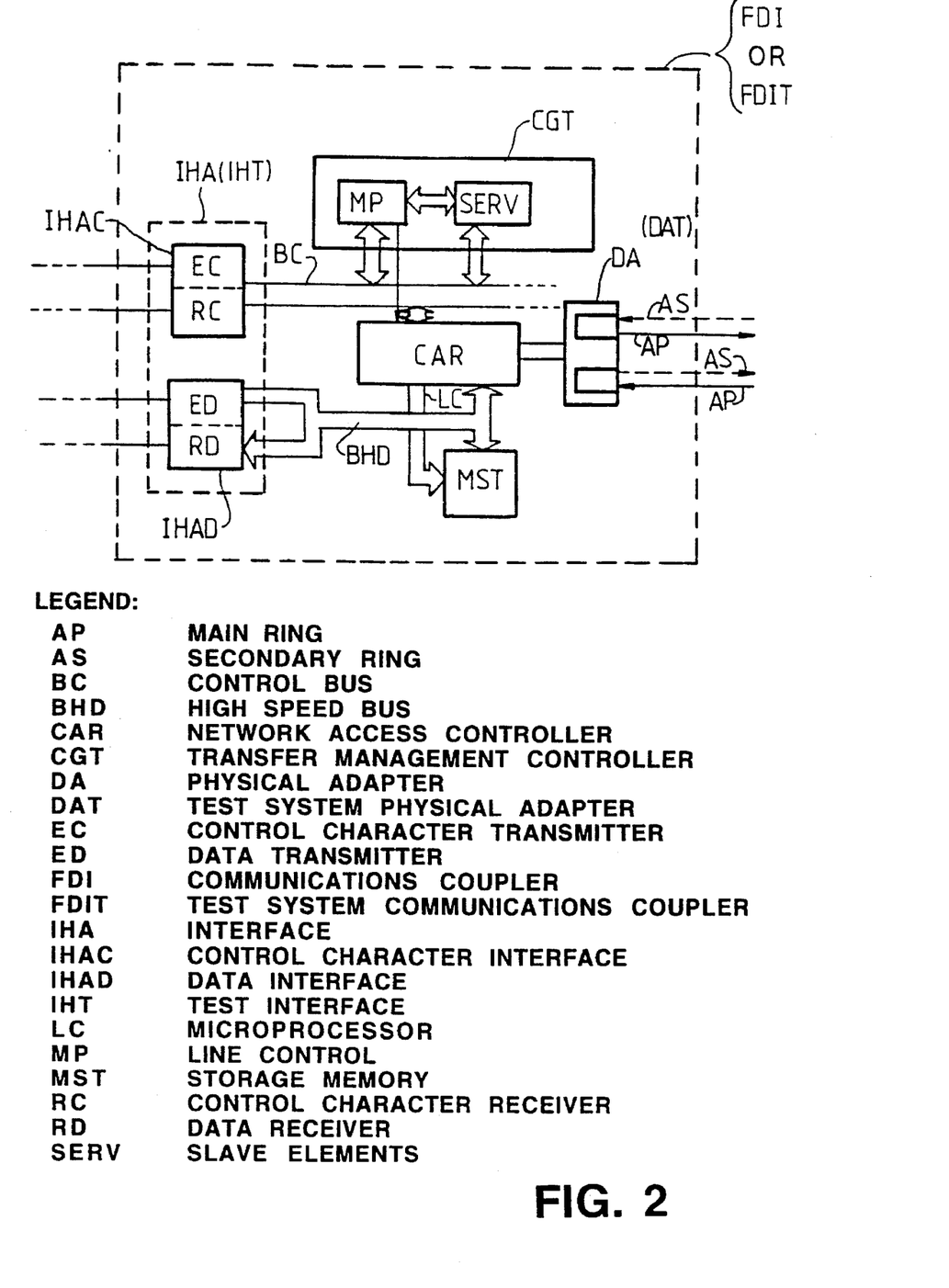
FIG. 2 is a block diagram that shows the essential components of a communications coupler as described in the patent application referred to above.

Referring to FIG. 2, the communications coupler FDI is connected to universal coupling device GPU through interface IHA, itself including an interface IHAC for the control characters and an interface IHAD for the data to be transmitted, also referred to as useful data.

Interface IHAC includes a part EC for sending the control characters and a part RC for receiving the control characters of frames coming from the network.

Interface IHAD includes a part ED for sending useful data of frames destined for the network RE and a receiving part RD adapted to receive the useful data of frames coming from the network RE.

The communications coupler FDI includes:

a transfer management controller CGT for use with a microprocessor MP associated with a group of slave elements SERV (RAM or EPROM memory, couplers, etc.) The management controller CGT is associated with a control bus BC to which elements MP, SERV, and interface IHAC are connected;

a network access controller CAR, in turn connected to a device DA for physical access to the network and to control bus BC;

a high-speed bus BHD (capable of carrying frames at rates on the order of 100 megabits per second), connected to interface IHAD and to network access controller CAR; and a storage memory MST connected to high-speed bus BHD and to network access controller CAR through a control line LC (including control wires for writing to and reading from the memory, as well as information for addressing the latter).

Now consider the transmission of a given frame from the computer ORD. After passing through universal coupling device GPU the frame arrives at the interface IHAC, in the form of useful data sent to part ED of interface IHAD, and a control block sent to part EC of interface IHAC. These control blocks include control characters relating to the content of the frame in question as well as information relating to the nature of the operations to be performed on this frame by the communications coupler FDI.

Management controller CGT reads the control blocks in interface IHAC and interprets them to form control characters in accordance with the FDDI standard relative to the frame in question. As soon as these control characters have been formed, they are sent through bus BC, controller CAR, and bus BHD to storage memory MST. During this time, the microprocessor MP manages the transfer of useful data from the frame to storage memory MST. As soon as the control characters and useful data have arrived in the memory, network access controller CAR, under the control of microprocessor MP, sends the frame thus formed to network RE.

It is clear that a process exactly opposite to that just described takes place during reception of a frame of the FDDI type coming from the network RE.

The existence of two separate buses BC and BHD for the control blocks and for the useful data, respectively, makes it possible to transfer the control blocks on bus BC independently of the corresponding useful data on bus BHD, and the control block can be transferred on its bus before, at the same time as, or after the corresponding useful data have been transferred on the bus BHD. The recent appearance of FDDI or TPDDI networks requires test tools that provided engineers or users of these networks with the following functions:

traffic generation (generation of frames): this function is needed for qualification of specific devices, such as communications couplers like those shown in FIG. 2, or the wiring of such communications couplers, or the group of transmission media;

display of the network: the FDDI standard provides for obtaining from any station, information on the status of the network at a given moment, including the load rate of the network, the error rate, the number of frames in circulation, etc. It is therefore useful to display on a screen the status of the network on the basis of this information; and compliance test: all FDDI-type devices must obey the standard, i.e., they must offer a given number of services. It is therefore necessary to have a tool capable of checking the existence and correct operation of such services. Among the latter are in particular the frames called SMT, defined in standard FDDI.

It would be desirable to provide a test system that meets the requirements listed above, and can be used with a communications coupler similar to that in FIG. 2 in which function tests are implemented (in slave elements SERV) (generation and reception of traffic . . . ) and a minicomputer of the PC type (personal computer) running specific test software. It would also be desirable for this test system to be able to drive any communications coupler connected to the network, similar to the communications coupler FDI as shown in FIG. 2, and to display the entire network on a screen of the minicomputer.

SUMMARY OF THE INVENTION

A test system for a high-speed ring network is provided that includes a data-processing unit equipped with a data-display device, connected through a link to a communications coupler connected to the network; a network test program running on the unit; and a group of function tests, implemented in the communications coupler, for generating frames on the network, the test program driving the communications coupler by sending it commands that perform the set of tests, and commands to display information relating to the status of the network, as received by the coupler and sent by the coupler to the processing unit.

The test system of the invention meets the requirements listed in the background of the invention, and can be used with a communications coupler similar to that in FIG. 2 in which function tests are implemented (in slave elements SERV) (generation and reception of traffic . . . ) and a minicomputer of the PC type (personal computer) running specific test software. The test system of the invention is also able to drive any communications coupler connected to the network, similar to the communications coupler FDI as shown in FIG. 2, and can display the entire network on a screen of the minicomputer.

BRIEF DESCRIPTION OF THE DRAWING

The invention will be more fully understood from the following solely exemplary description of a preferred embodiment taken in conjunction with the accompanying figures in which.

DESCRIPTION OF A PREFERRED EMBODIMENT

Figure 3:
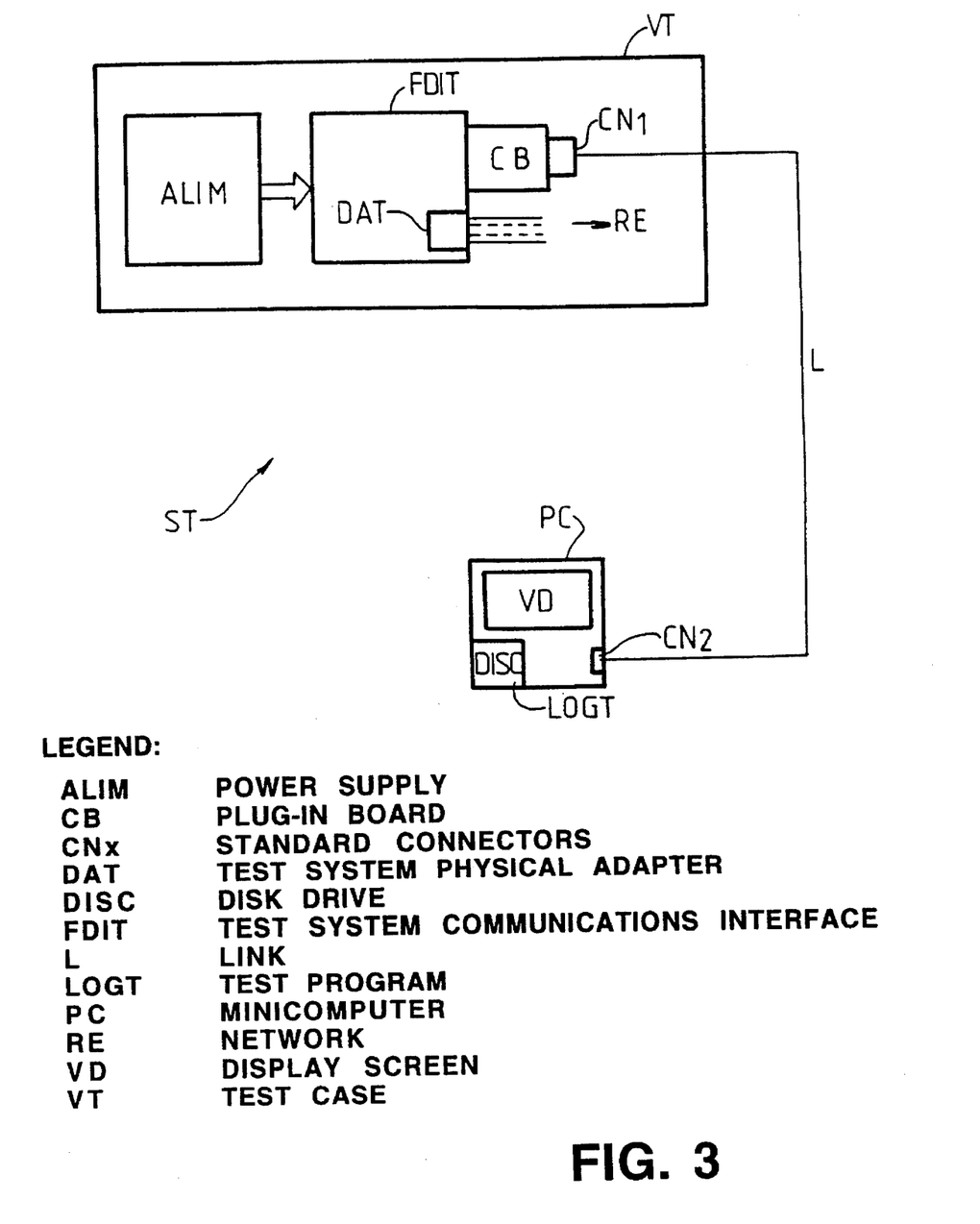
FIG. 3 is a block diagram that shows the essential components of the test system of the invention.

With reference to FIGS. 1 and 3, the test system ST according to the invention is shown in FIG. 3 and includes a test case VT connected by a link L specific to a minicomputer PC. This link is of the standard RS232 type. It is connected to minicomputer PC through a standard connector $CN_2$ and is connected to case VT by a connector $CN_1$ of the same type as $CN_2$.

Minicomputer PC includes in particular a display screen VD and a disk memory DISC having either a hard disk or a floppy disk on which the test software running on the PC is permanently recorded. The computer can be any kind of minicomputer currently available.

Test case VT includes a communications coupler FDIT of the type that is similar in every respect to FDI of FIG. 2, with the power being furnished by a power supply ALIM and connected through a physical adaptor DAT similar to DA to network RE.

Slaves SERV and FDIT contain a set of function tests ETF implemented by the microprocessor MP upon receiving commands from the minicomputer PC (which in this case assumes the role played by the CPU for a board (FDI). This assembly generates traffic on the network RE by sending predefined frames in accordance with FDDI standards (e.g., of the type LLC, SMT, or NIF, as discussed below), receiving frames of the same type coming from the network RE to display their contents, receiving and resending these same frames in the ECHO mode, as defined for tests number 3 and number 4 explained in detail below.

Note that FIG. 1 shows the functional diagram of the test system according to the invention, while FIG. 3 shows the physical arrangement of each of the elements constituting the test system.

Test case VT is in the shape of a parallelepipedic suitcase and is readily transportable by a manual operator.

Communications coupler FDIT is connected to link L by means of a connector $CN_1$ which is itself mounted on a plug-in board CB.

Figure 4:
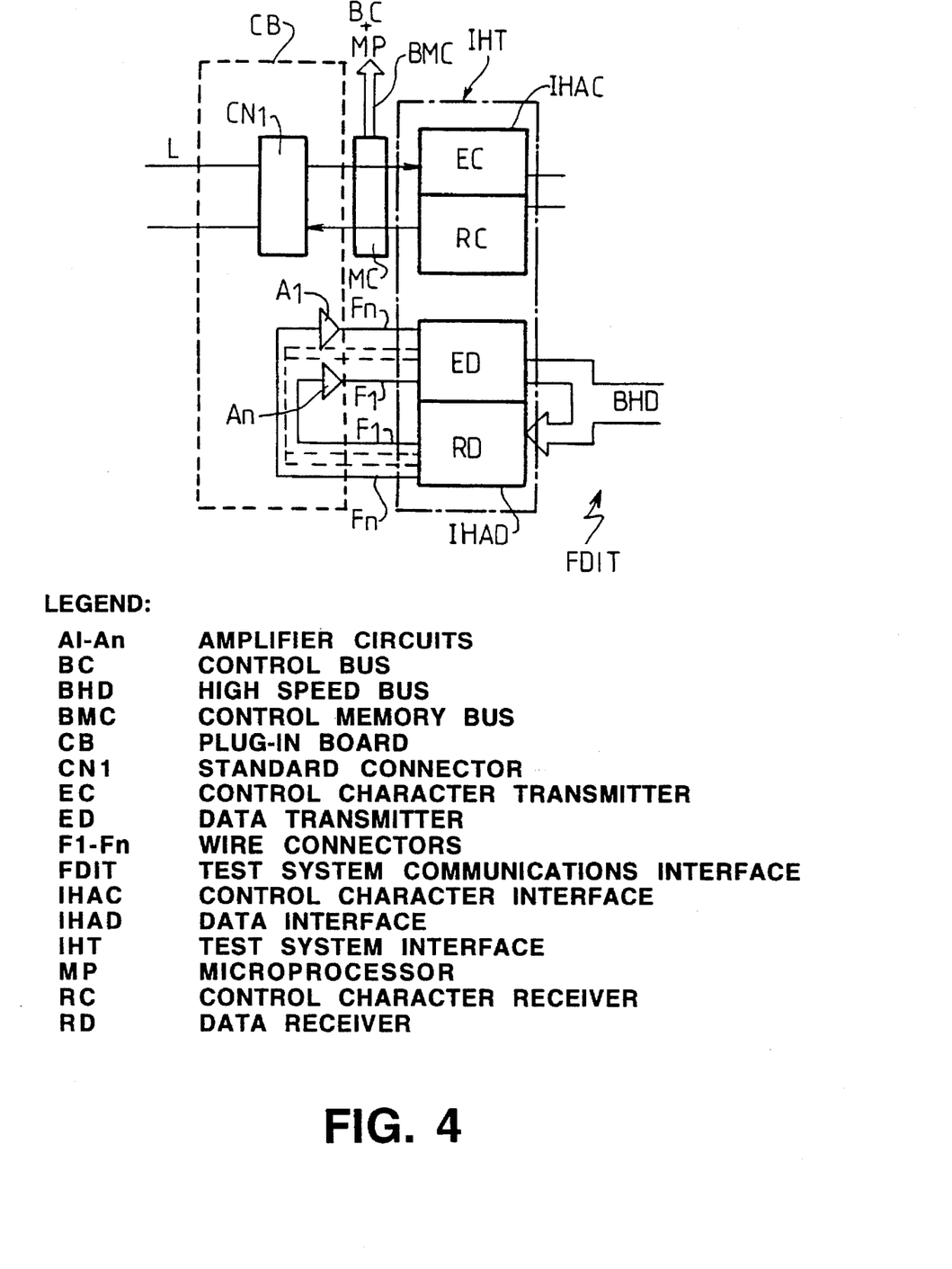
FIG. 4 is a block diagram that shows how the communications coupler of the test system is connected to the link to the minicomputer through a plug-in board.

With reference to FIG. 4, the plug-in board CB is connected to communications coupler FDIT by an interface IHAD similar to IHA and by control memory MC and interface IHAC. FIG. 4 also shows in greater detail how interface IHT is connected to plug-in board CB. Plug-in board CB makes it possible to connect parts ED and RD of IHAD through a plurality of wire connections $F_1$ to $F_n$ and to reform them as $A_1$ to $A_n$, with wire connections $F_1$ to $F_n$ being connected in series respectively with amplifier circuits $A_1$ to $A_n$. Thus, transmitter section ED is looped back to part RD so that a frame coming from network RE and reaching part RD through bus BHD is sent out again on section ED and then on bus BHD to memory MST and is then sent back out into the network again.

Connector $CN_1$ is connected to a control memory MC which is itself connected to each of the two parts EC and RC of IHAC and to control bus BC (and hence to MP) by a bus BMC. MC belongs to FDIT. Similarly, coupler FDIT can be coupled:

- either to minicomputer PC (by plug-in board CB), in which case it is an integral part of test system ST. In this case, the control blocks sent from minicomputer PC through L and $CN_1$ are initially stored in MC before being sent out on BC to be analyzed by MP; IHAC is not used. MC then performs the series-parallel conversion between series link L and bus BC, or
- directly to the GPU, in the absence of a plug-in board CB, in which case FDIT acts as the communications coupler of a normal FDDI station. IHA is then connected to the data bus of GPU and memory MC is connected to the control bus of the latter. IHAC is then used and MC merely stores the data temporarily before they are transferred to IHAC.

In the following, therefore, we will assume that FDIT is associated with ST. Minicomputer PC and the communications coupler then exchange between them only the control blocks and no useful data.

To test the network RE shown in FIG. 1, it is sufficient to insert into the network, apart from test system ST, a second test system $ST_1$. It is then possible to check whether everything that has been sent by one of the two test systems, ST for example, has been correctly received by the other system $ST_1$, and vice versa. It is also possible to capture one or more frames to check on their condition. To perform a valid test, the network is loaded 100%, and a check is made to determine whether all connections have been made correctly, and that there is no problem with optical transmission, if a network of the FDDI type is involved, and that the specific stations including communications couplers such as FDI are functioning correctly, as well as all their components, during the test.

Figure 5:
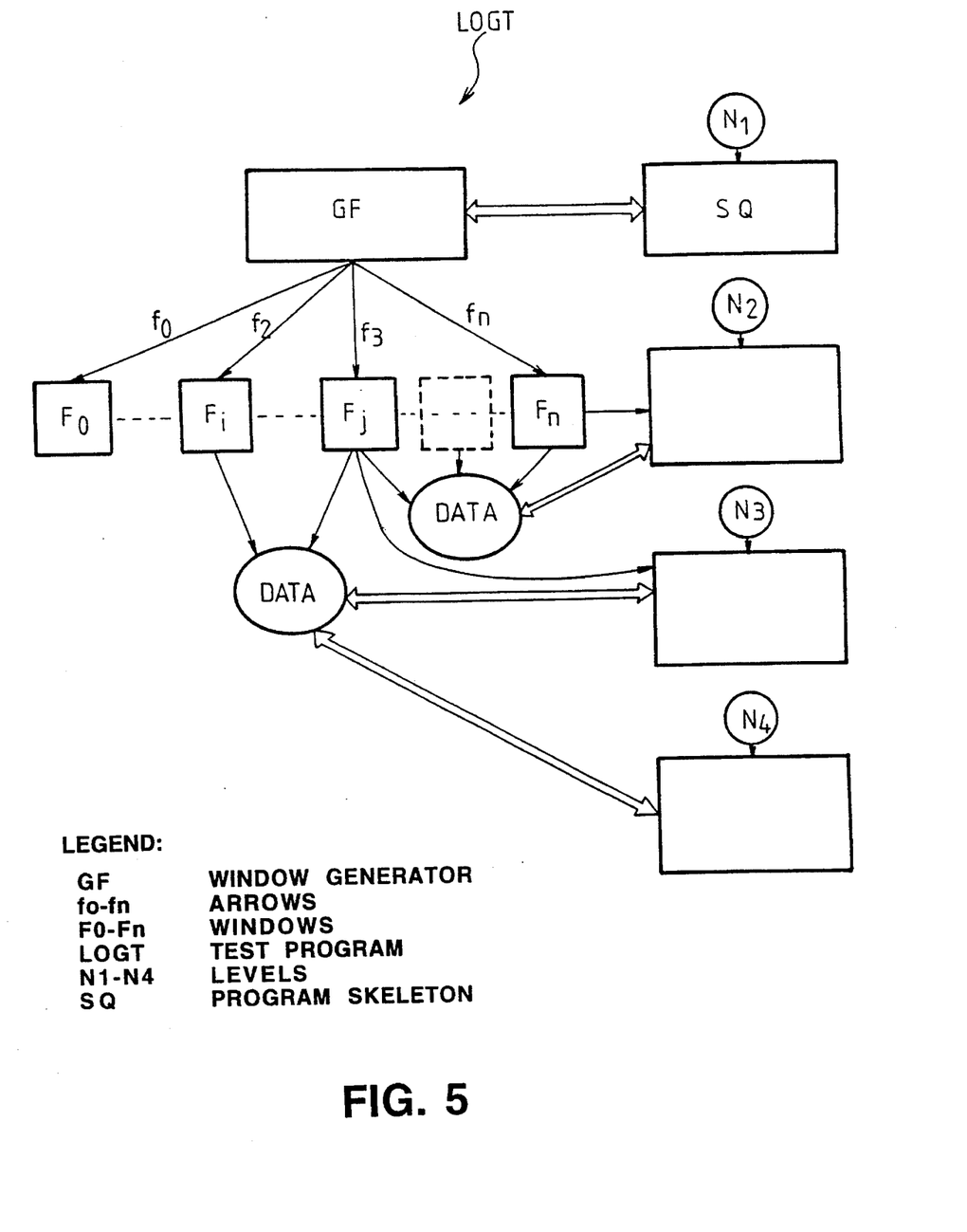
FIG. 5 is a block diagram that shows the general structure of the test program of the test system of the invention, running on the minicomputer.

FIG. 5 illustrates the structure of the test program LOGT running on minicomputer PC. This program LOGT is built around a window generator GF, with the windows that it creates being designated by $F_1$ to $F_n$. The fact that GF generates windows $F_1$ to $F_n$ is symbolized by the group of arrows $P_1$ to $f_n$ connecting it to the corresponding windows.

In addition, the program LOGT includes four levels $N_1$ to $N_4$. The first level $N_1$ defines the skeleton SQ of the program: this skeleton specifically allows dimensioning of the windows, defining their tree structures, i.e., the way in which they link to one another, and defines the procedure calls. It is at this first level $N_1$ that window generator GF makes its call to construct the different windows $F_1$ to $F_n$. They are constructed using a root menu included in this skeleton.

The second level $N_2$ describes the various commands that can be sent to all the communications couplers of the FDI type as well as to any FDIT board of any test system ST connected to network RE. This second level likewise describes the structure of the responses to these different commands that are received, the responses relating primarily to the display of the status of the various elements constituting a board FDI, the status of the various counters included in it, etc.

The third level $N_3$ executes predefined functions: these functions specifically display the entire ring forming network RE and also display what is occurring inside each communications coupler of a station connected to this ring.

The last level $N_4$ permits rapid programming of the FDIT board of test system ST.

In the exemplary embodiment described here, there are 40 possible windows numbered from 0 to 39, i.e., windows $F_0$ to $F_{39}$. Each window has a maximum of 23 fields $C_0$ to $C_{22}$, each field being identified by a description with a maximum width of 19 characters.

Three types of actions are associated with a given field of a window:

- calling another window, which window is then identified by its number (from 1 to 39, with 0 conventionally signifying that this window does not define a specific action, and with window 0 actually including the root menu of test program LOGT);
- calling a function identified by a subscript (in the embodiment described here, this subscript is larger than 1,000). This function is operated by a specific program (at level $N_3$); and
- defining a datum with a maximum width of nine characters. The width is then defined by a subscript between −1 and −9 (with −1 corresponding to a width of one character and −9 to a width of nine characters). The term "character" on a computer screen means either a letter, a number, or a punctuation mark or symbol. Each character corresponds to a known combination of a fixed number of bits (eight for example).

On the screen of the minicomputer, the upper left corner position of a window is defined by two coordinates X0 and Y0, where X0 is between 0 and 79 and Y0 is between 0 and 24. If X0 and Y0 are equal to −1 the position of the window on the screen is determined by the LOGT program: this signifies that when one window calls another, LOGT tries to place the latter near the former so that the appearance of both of them on the screen will appear simple and clear to the human operator working on the screen.

Figure 6:
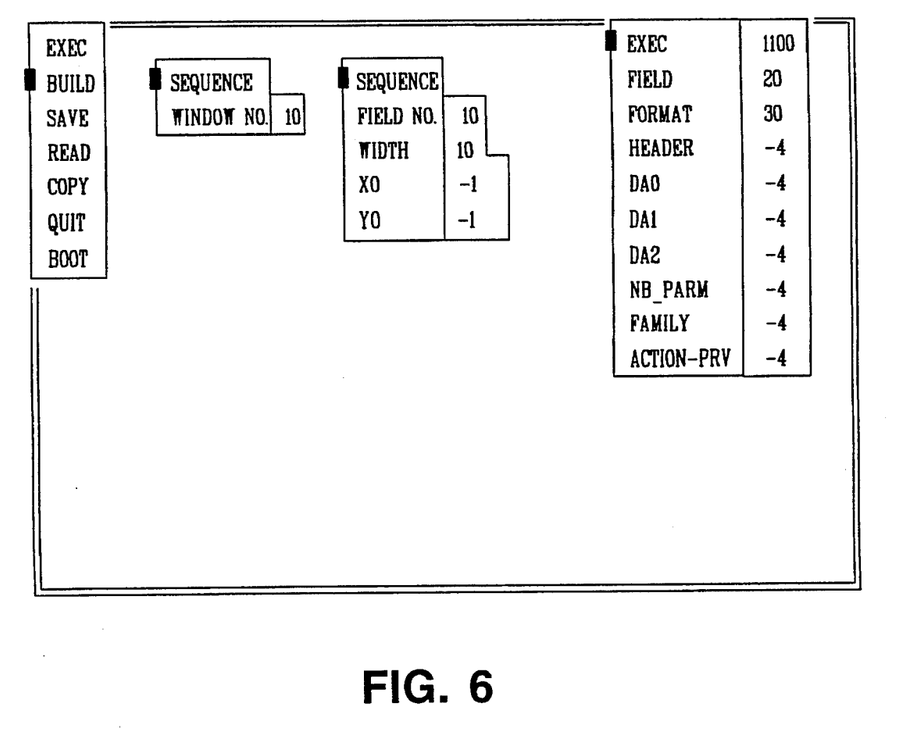
FIG. 6 is a screen display showing a plurality of pull-down menus.

FIG. 6 shows a screen of minicomputer PC and illustrates the definition of a window by means of a function called BUILD. The definition of the window in question, namely the window numbered 10, i.e., window $F_{10}$, is accomplished with the aid of a part of window $F_0$ that calls the root menu of LOGT as well as three windows $F_1$, $F_2$, $F_3$ all of which call the function BUILD to define the window in question, specifying its format and describing it by indicating primarily the number of the field, its width, etc.

Window $F_3$ can also call the COPY function (see below). Each of windows $F_1$ to $F_3$ can be reprogrammed at any time by the function BUILD, thereby redefining its length, the number of fields, their width, etc.

Thus, referring to FIG. 6, it can be seen that an attempt is made to construct a window labeled "10" using the function BUILD, with a field number of 10, whose width is ten characters each, with the positioning of the window being controlled by the program such that X0 and Y0 both are set to −1. The field whose description is "EXEC" calls the function of subscript 1100, with the field with the description "FORMAT" calling window 30, while the field with the description "FAMILY" is associated with a datum four characters wide. All the fields whose descriptions appear at the upper right in FIG. 6 also have a width of four characters.

There are also other functions that relate to level $N_1$. These are the functions labelled as follows: "SAVE", "COPY", and "BOOT". The first of these loads or saves a configuration of the entire test program LOGT at a given moment, i.e., the group of 40 windows available in a special memory of the PC, the memory being of the RAM type, for example. The second recopies a source window to a destination window, with the windows being identified by their numbers. This function thus recopies source window $F_{25}$ to destination window $F_{35}$. The third creates or modifies a particular file containing the name of a configuration file loaded during execution of the LOGT program: it therefore memorizes the contents of 40 windows at a given moment. When the program is relaunched, the resultant configuration is the one it had when it left.

Now let us consider level $N_2$ regarding the sending of commands to the FDIT board and the display of the responses corresponding to these commands: this operating mode allows transmission of a command to the FDIT board through the RS232 link, and then display of the response obtained on the minicomputer screen.

To create and execute a given command, three windows are required:

a) The window of the "COMMAND MESSAGE" containing the command message to be sent to the FDIT board (PC and FDIT exchange only command messages). This type of window, in the embodiment described here, has a number between 10 and 18.

b) The "FIELD" window shows the field number of the expected response. It is one of windows $F_{20}$ to $F_{28}$.

c) The "FORMAT" window describes the display format of the various response fields, the display format on the screen of the minicomputer. This window is one of windows $F_{30}$ to $F_{38}$.

The "COMMAND MESSAGE" window therefore contains a command message, as stated above. The message is written in sixteen-bit words, in hexadecimal code. The most significant eight-bit byte, associated with the "HEADER" field, represents the command code, while the low-order eight-bit byte indicates its length (the latter is expressed in eight-bit bytes). The sixteen-bit word corresponding to the "HEADER" field is placed at the head of the message. The "HEADER" field is followed by other fields containing the other command data, and a description recalling the interpretation for each field located behind the "HEADER" field.

The "FIELD" window describes a response structure and indicates the field number of the response as well as the size of each field expressed in eight-bit bytes, with the legal values in the embodiment described here being 1, 2, and 4.

The "FORMAT" window describes the display format of a response field and the associated description. The FORMAT code is identical to that of the well-known C language function, namely "PRINTF". The display format is therefore one that is normally used in minicomputers.

The usual commands in the embodiment described here are the following:

The connection command, also called the "CONNECT" command, allows the FDIT board to be inserted into the network RE, with a specific field defining the operating mode of the board.

The disconnect command "DECONNECT" allows the FDIT board to be disconnected from the network RE. It therefore cancels out the effects of the CONNECT command.

The "SEND-FRAME" command causes a frame of type SMT to be sent, with this type of frame being defined in the above-mentioned ANSI standard. The definition of the SMT frames in fact constitutes a subset of the FDDI standard as defined by ANSI. This frame is sent by FDIT over the network and is recovered by the corresponding board of test system $ST_1$ which sends a response frame of type SMT. The response frame is displayed on the screen in hexadecimal form. This command is used during interoperability tests of the network RE.

The initialization command "INIT-PTCOL" initializes the parameters of level MAC (medium access control), with the latter being defined in the FDDI standard. These parameters are the minimum value of the rotation time in the ring (target token rotation time), whose symbol is TTRT, defined by the standard, and less than 4 milliseconds long. This same command likewise defines the maximum value of this same TTRT, which must be less than 165 milliseconds. This command likewise defines the desired value of the rotation time of the token in the ring during the initialization of the level MAC, this value being between the minimum and maximum values of the TTRT. Other parameters of this kind are those that define whether there is or is not a priority assigned to the asynchronous traffic; whether board FDIT must receive all the frames or only the valid frames; whether operation is in the long-address or the short-address mode (these two modes are likewise defined by the FDDI standard). They are also the short-group address of the station when operating in the short-address mode, or the short-address of the station, and the long address of the station, when operating in the long-address mode.

The "SET-VALUE" command is used to modify a parameter of the SMT type of board FDIT or any other FDI board of any station in the network RE. This command is executed in two stages:

a request from a transaction identifier to the station affected by this change of parameters; and sending the new parameter value to the station in question, through a special frame specified in the FDDI standard.

At the end of this two-stage operation as outlined above, a parameter likewise specified in the standard is displayed and reports the success or failure of the operation. The entire two-stage procedure outlined above is in accordance with standard SMT 6.2of the FDDI standard.

The "RESET" command resets the FDIT board during operation or any other FDI board of a station connected to the network RE, without having to perform from the beginning all of the operations of the BIST (BUILD-IN SELF-TEST) type, known in current practice and which involve initialization of all the components on a given board, in this case FDIT or FDI boards.

The "STATUS" command provides information on the status of the FDIT board or any FDI board connected to the network at a given point in time. This information may relate, for example, to the number of eight-bit bytes received or sent per second, and the status of certain robots defined in the FDDI standard and which are always present in the communications couplers, the robots being of the CFM, PCMB, or PCMA type for example. From the status of these robots one can determine certain information on the status of the corresponding board, for example whether the two connections from the board to the network RE are active or not. One can also obtain information about the status of the components constituting elements CAR and DA of boards FDI or FDIT in FIG. 2, and more specifically the components marked CMS, CCD, and FORMAC whose roles are defined precisely in the French Patent Application 89 10 156, filed Jul. 27, 1989.

The "SET-TEST" command places either FDIT boards or any other boards FDI in different test configurations. There are five types of tests, with tests 1 to 4 being of the functional type, i.e., verifying correct operation of the board, while test 5 is of the operational type, more specifically dedicated to generating traffic on the network RE.

These various test modes are as follows:

Test Number 1: this is the receiver test, used to check the operation of an FDI board (or an FDIT board) when receiving frames of the LLC type (defined by the FDDI standard). These frames include data to be carried and are used in the network. For this test, board FDIT sends one frame or several frames of the LLC type over the network RE and checks to see whether the FDIT board of the second test system connected to the network, namely system $ST_1$, is receiving these frames correctly. The test can also be used to check whether any other FDI board is receiving the frames sent by the first FDIT board correctly.

Test Number 2: This test checks the function in the send mode of all the FDI boards (or FDIT boards). The FDI board under test then sends frames of a specified length. These are sent in the form of several blocks of frames sent in a given time interval. These frames can be LLC frames of the asynchronous or synchronous type, with a short or long address. Once they have been sent by the board whose send function is being checked, a determination is made using the FDIT board of test system ST that they are correct, assuming that the FDIT board is in good operating condition, as well as the support system for network transmission.

Test Number 3: This test checks the correct operation of any FDI (or FDIT) board. It is called the local repeater test. It operates specifically when the optical transceivers on the board in physical adaptation device DA (see FIG. 2) are looped back on themselves with a fiber length greater than 1 kilometer. To perform this test, a frame of the asynchronous type with a short address is addressed by ST (and thus in fact by FDIT) to the FDI board of the station under test. This frame sent to the FDI is repeated by the plug-in board in the latter and sent back out; onto the network where the FDIT board verifies that the frame thus sent is in good condition. In this particular test, the length of the frame data field is eight-bit bytes. This test is then initialized by ST.

Test Number 4: This test is called the repeater test, and resends all the frames (except SMT type frames) addressed to the FDI board under test, from the latter to the stations that sent them. This test is not initialized and cannot run if the frames are sent over RE by any one (or several) station(s).

Test Number 5: This test, called the operational test, uses the FDIT board as a traffic generator on the network and/or as the network administrator.

For all of Tests 1 to 5, a certain number of parameters must be defined that will be contained in the fields of windows calling these various tests: they include the short destination address (sixteen bits for frames sent in tests 2 and 5), a parameter that authorizes or inhibits sending of test frames and shows the counter values contained in the FDI boards (in slaves "SERV"), during a test between two stations connected to the network, a parity parameter, a parameter defining the size of the frames sent in eight-bit bytes (for Tests 2 and 5), the value of the quantity Fc (frame control, part of the control characters) for frames sent in Tests 2 and 5, a parameter defining the depth of the FIFOs used in 32-bit words for the FIFO memories constituting interfaces IHAC and IHAD (see FIG. 2), a parameter indicating whether the station under test is one with a single or double connection to the network, and a parameter defining the transmission frequency of frames NIF, expressed in seconds, the frames NIF likewise being defined in standard FDDI. The latter parameter directly controls the time needed to acquire the new network configuration during a station connection for example. Other parameters are required, for example the long destination address of the frames sent during Tests 2 and 5, the wait between transmissions of blocks of frames between 0 and 2 seconds, and the number of frames that can be sent in a "BURST" in Tests 2 and 5.

The "COLLECT-MA" command reassembles the data contained in a group of counters at the "medium access control" level. These counters are part of slaves SERV of controller CGT shown in FIG. 2. The data relating to the total number of frames on the ring, the number of frames lost, the number of frames containing errors, the number of frames sent and received by the destination without any errors, the number of frames sent but with problems (addressee absent for example), the number of frames sent but not recognized by their addressees, the number of frames sent and seen on the ring with an error FCS, the number of frames received with or without errors, the number of frames sent and not copied by the addressee, the number of frames received with errors FCS, the number of frames received whose addresses were recognized by other stations, etc. (FCS=frame check sequence, defined by standard FDDI, the set of bits located at the end of the frame for error detection) can all be collected.

The "GET-VALUE" command gets the value of a parameter or a group of parameters. It can be intended either for an FDIT board or for any other FDI board of a station connected to the ring. In this case the command is sent in SMT form (according to standard SMT 6.2).

The "GET-VALUE" and "SET-VALUE" commands are executable on any station in the network, whether the communications coupler is the type with an FDI board shown in FIG. 2 and described in the abovementioned French patent application, the type with an FDIT board, or a communications coupler of any type. These commands conform to standard FDDI.

Alternatively, commands such as "RESET, " "STATUS, " and "COLLECT-MA" are sent on the network in the form of SMT frames and are ignored by communications couplers other than FDI. They are therefore destined uniquely for tests of FDI boards.

The "CONNECT", "DECONNECT", "INIT", and "PTCOL" commands can be executed only on the FDIT board. These latter commands are coded with a destination field of zero. The special commands mentioned above are coded with a destination address field equal to zero if they are addressed to station FDIT of the test system, or equal to the address of the addressee in the contrary case (other FDI board).

To connect an FDI board to be tested, the following functions must be performed after powering up the board:

"INIT-PTCOL": to initialize the MAC parameters of the board;

"SET-TEST": to select a specific test, one of Tests 1 to 5; and

"CONNECT": to connect the board in question to ring RE.

All modifications to the test (shifting from one test to another) imply previous disconnection of the station from the network, using the "DECONNECT" command. After selecting the test to be performed (using the "SET-TEST") command, the "CONNECT" command reinserts the board in the ring.

In the event of an error in test operation or on the board, the "RESET" command reinitializes communications coupler FDI. Then the three commands listed above must be used to reconnect the board to the network RE.

One specific function called "AUTOEXEC", which is in fact a specific command, repeatedly executes a series of commands (a maximum of three commands). It can be used for example to connect and disconnect a station to and from the network periodically during the reconfiguration test. One specific field then defines the time interval separating the transmissions of two successive commands. The minimum value of this field is zero, with the maximum value of 20 corresponding to one second of time. The commands are selected by setting the given field associated with the name of the command to a value of 1.

As can be seen from the above, level $N_3$ contains a certain number of predefined functions. These functions respond to two types of needs:

display of the activity of an FDI board (configuration, charge rate, error rate, etc.); and display of the activity of the network and specifically of any FDDI type station using methods that conform strictly with the FDDI standard.

These functions permit access through the FDIT board to all the stations on the network, of either the FDI or another type.

The principal ones include the following:

The "BUILD-MAP" function acquires the list of addresses MAC of the stations on the network, and memorizes them permanently. This list of addresses is then used by the other functions to select a specific target station. These MAC addresses are obtained through frames of the NIF type. As they are obtained, one specific window displays the address of the interrogated station (target station) and the desired (address of next station). This function operates by going around the ring, searching for the address of the next station in turn, through successive approaches;

the "VIEW STATUS" function displays the status of the FDI board and uses parameters that do not exist in the FDDI standard. It is therefore strictly reserved for couplers of the FDI type. The list of displayed parameters, which is not exhaustive, can be as follows:

configuration: displays the status of the station (not FDDI), whether the station includes one or two active attachments or none.

charge on the station during transmission and reception in megabytes per second (not FDDI);

number of frames sent and received, number of frames not copied, number of frames on the ring, number of frames with errors, number of frames lost, contents of error counters on optical receivers, contents of error counters on optical receiving buffers (all the parameters listed above are defined by the FDDI standard), contents of error counters relative to frame reception (not FDDI), number of times the ring became operational, number of expirations of token counter (FDDI standard). The token counters and error counters are contained in slaves SERV of controller CGT (FIG. 2).

The "STD-VIEW" function: this function displays a station using information obtained from the frames called "SIF-0" and "SIF-C" in accordance with standard SMT 6.2.

The "SIF-CONFIG" function and the "SIF-OPER" function serve respectively to display the contents either of a SIF frame called the configuration frame or of a SIF frame called the operating frame, the frames conforming to standards SMT 5.1 to 6.2. They are used mainly in interoperability tests.

The "VIEW RING" function generates an image of the double ring using frames NIF, SIF-0, and SIF-C in accordance with standard FDDI. The image of the ring thus generated includes a maximum of 15 stations. Station configuration is shown in graphic form, displaying the primary ring in one color, and the secondary ring in another (green and red, for example), for the specific fields called Tx and Rx, indicating the number of frames sent and received per second by the station. This information is refreshed periodically so that the reconfigurations can be determined in real time. Other functions make it possible for example to receive and display images sent by any station of type FDI, to reinitialize series link RS232 from the FDIT board, to acquire periodically one or several SMT parameters allowing the collected values to be displayed in graphic form on screen VD of computer PC.

The "CATCH" function is used to read a frame received by any FDI board using the FDIT. It is executed in two-stages:

initializing the frame capture parameters: for this step, the following parameters must be known: the address of the addressee of the command, the value Fc of the frame captured, and the address of the source station of the captured frame; and reading from the buffer memory of board FDIT. After reading, the capture mode is automatically reset, with the parameters defined beforehand by the initialization stage.

If none of the frames is captured, a message indicating that no frame was captured is displayed on the screen.

The capture buffer memory can memorize up to 128 eight-bit bytes of data. When the data field of the captured frame exceeds this size, a message indicating that the captured frame is incomplete is displayed on the screen. Reading the capture buffer memory reveals flags EAC (according to the FDDI standard) of the frame received, its length from character Fc to FCS inclusive, the frame destination address, the frame source address, and obviously the useful data of the latter from the source address to the final character of frame SCS, inclusive.

Another function associated with level $N_3$ is used to display a station as well as its physical neighbors. This function is called the topology function.

Level $N_4$ is called the fast or "FAST" mode and is used for rapid programming of the FDIT board. This mode is used to access all the functions of level $N_3$ as well as an extremely rapid initialization of this board using the minicomputer keyboard. The user can modify the parameters as desired. The parameters thus modified and memorized in the windows corresponding to the functions of level $N_2$, making it impossible to save the desired configuration (before modification of the user parameters) in an appropriate file.

A number of keys on the board, called direction keys, allow preselecting the desired function. Another button activates the desired function, while a third button quits a function when desired.

Other modifications and implementations will occur to those skilled in the art without departing from the spirit and the scope of the invention as claimed. Accordingly, the above description is not intended to limit the invention except as indicated in the following claims.

What is claimed is:

1. A test system (ST) for a high-speed ring network (RE), the test system comprising:
    a data processing unit (PC) equipped with a data display device (VD) connected through a link (L) to a communications coupler (FDIT) connected to the network, transferring data frames thereon the communications coupler comprising:
        a transfer management controller (CGT) including a microprocessor (MP) and a set of slave elements (SERV) with a set of function tests, the transfer management controller being associated with a control bus (BC) to which the microprocessor (MP), the set of slave elements (SERV), and an interface (IHAC) are connected;
        a network access controller (CAR) in turn coupled both to a device (DA) for physical access to the network and to the control bus (BC);
        a high-speed bus (BHD) coupled to the interface and to the network access controller (CAR); and
        a storage memory (MST) coupled respectively to high-speed bus (BHD) and to the network access controller (CAR) through a command line (LC),
        the control bus carrying control blocks including control characters that relate to the constitution of the frames, and information relating to the nature of the operations to be performed on each frame by the communications coupler,
        the high-speed bus carrying the useful data from the frames corresponding to control blocks carried on the control bus, and
        the management controller being for reading the control blocks and interpreting them to form the control characters that frame the useful data of the frames to be sent on the network, and for forming control blocks to be sent to the data processing unit, beginning with the control characters framing the useful data of a frame coming from network (RE);
    a network test program (LOGT) running on the data processing unit; and
    a set (ETF) of function tests implemented in communications coupler (FDIT) for stimulating the transfer of test frames on the network,
    the test program (LOGT) both controlling the communications coupler by sending it commands that allow running the set of tests, and also the test program controlling the communications coupler by displaying data on the status of the network, such as data received by the coupler and sent by the coupler to the processing unit.

2. A test system (ST) for a high-speed ring network (RE), the test system comprising:
    a data processing unit (PC) equipped with a data display device (VD) connected through a link (L) to a communications coupler (FDIT) connected to the network;
    a network test program (LOGT) running on the data processing unit for use with a window generator (GF) for generating a plurality of windows $F_1$ to $F_n$, and including at least three levels $N_1$ to $N_3$, wherein
        the first level $N_1$ defining the skeleton (SQ) of the program for constructing the different windows;
        the second level $N_2$ describing a set of commands sent between stations on the network, as well as respective structures of the responses to the commands; and
        the third level $N_3$ performing predefined functions that permit displaying the entire network (RE), as well as displaying what is occurring within each communications coupler of a station coupled to the network (RE); and
    a set (ETF) of function tests implemented in communications coupler (FDIT) allowing frames to be generated on the network,
    the test program (LOGT) both controlling the communications coupler by sending it commands that allow running the set of tests, and also the test program controlling the communications coupler by displaying data on the status of the network, such as data received by the coupler and sent by the coupler to the processing unit.

3. The test system (ST) of claim 2 wherein each window comprises a given maximum number of fields ($C_0$ to $C_{22}$), each field being identified by a description of a maximum predetermined width, three types of actions being capable of being associated with each of these fields:
    a call for another window, identified by a given number between 1 and n;
    a call for a function identified by a given subscript, run by a specific program belonging to third level $N_3$; and
    a definition of a datum having a maximum width that is known in advance.

4. The test system (ST) of claim 3 wherein three windows are employed to perform a command determined by level $N_2$:
    a command message window containing the command message to be sent to communications coupler (FDIT) by data processing unit (PC);
    a field window indicating the number of fields of the anticipated response; and
    a format window describing the display format for different fields of the response on the display device (VD).

5. The test system (ST) of claim 3 further comprising:
    a command for placing the communications coupler in one of a plurality of test configurations, including test configurations of the functional type for allowing checking of the correct function of a communications coupler other than the communications coupler connected to the data processing unit, and test configurations of the operational type for generating traffic on the network.

* * * * *

UNITED STATES PATENT AND TRADEMARK OFFICE
CERTIFICATE OF CORRECTION

PATENT NO. : 5,487,073
DATED : January 23, 1996
INVENTOR(S) : Pascal Urien

It is certified that error appears in the above-indentified patent and that said Letters Patent is hereby corrected as shown below:

Column 5, line 61, "$P_1$ to $f_n$" should read -- $f_1$ to $f_n$ --.

Signed and Sealed this

Twenty-third Day of September, 1997

Attest:

BRUCE LEHMAN

*Attesting Officer*    Commissioner of Patents and Trademarks